Oct. 6, 1942.　　　F. W. CALDWELL　　　2,298,194
BIRD PROOFING
Filed Nov. 17, 1938
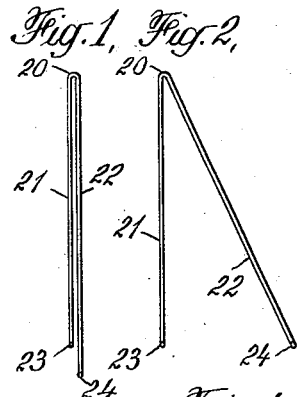
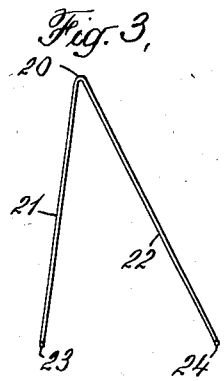
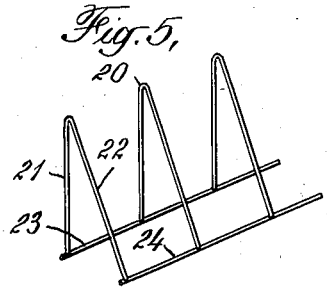
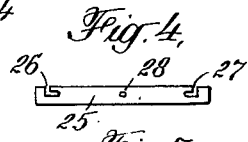
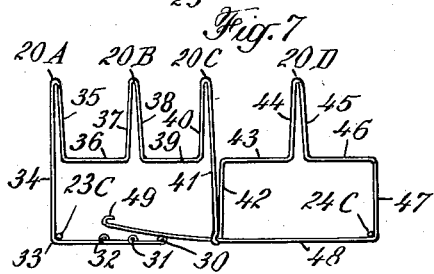
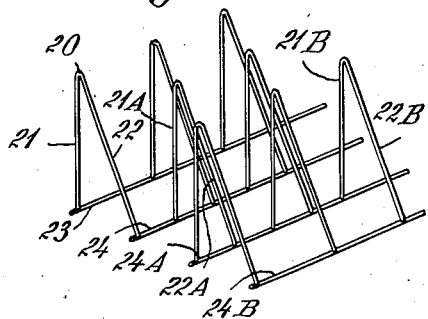
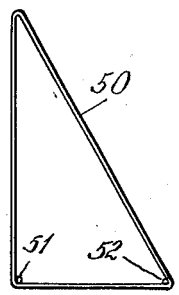
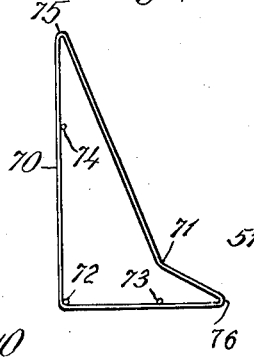
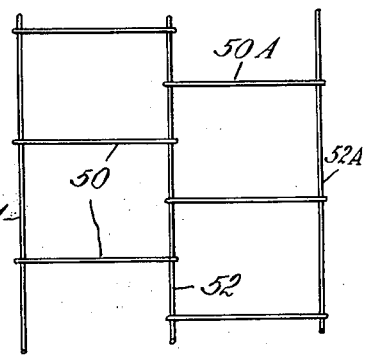
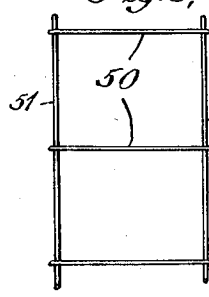
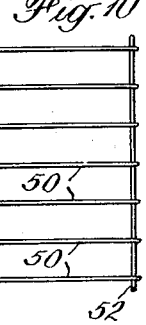
INVENTOR
Frederick W. Caldwell
BY
Marshall & Hawley
ATTORNEYS Patented Oct. 6, 1942

2,298,194

UNITED STATES PATENT OFFICE 2,298,194

BIRDPROOFING

Frederick W. Caldwell, New York, N. Y.

Application November 17, 1938, Serial No. 241,019

4 Claims. (Cl. 20—1)

This invention relates to improvements in bird proofing.

Its object is to provide an inexpensive material to be applied to buildings or other structures to prevent birds from alighting thereon, which is simple in construction and may be readily applied. It is common practice to apply wire netting to structures which are subject to the bird nuisance, but this expedient is unsightly, somewhat difficult to apply and has the unsurmountable disadvantage of catching leaves, papers and other debris.

One of the purposes of my invention is to overcome these objectionable features and to provide a material which is neat in appearance and self-cleaning.

Another object is to so construct the material that it will not injure the birds which come in contact with it, nor tear curtains which may be blown against it.

A further object is to provide a material which is flexible so that it may be made to conform to building structures of different shapes and which is adjustable so that it may be fitted readily to building structures of different sizes.

Another object is to provide a material which is less visible than such as has been available hitherto.

These and other objects of the invention will appear in the following specification in which I will describe several embodiments of the invention, the novel features of which will be pointed out in claims.

Referring to the drawing,

Fig. 1 is an end view of a preferred form of bird proofing which is made according to and embodies my invention. In this figure the material is shown in the form in which it is made and shipped;

Figs. 2 and 3 are similar views of the same material, opened different amounts to fit ledges of different widths;

Fig. 4 is a plan view of a cleat for fastening the material to a desired structure;

Fig. 5 is a perspective view of a part of a strip of the material shown in Figs. 1, 2 and 3, opened to a degree corresponding to the showing in Fig. 2;

Fig. 6 is a perspective view similar to Fig. 5, illustrating a part of a multiple strip form of my improved material;

Fig. 7 is an end elevation of a modified embodiment of the invention, applicable to wide structures and adjustable as to width;

Fig. 8 is an end view of a modification of construction which is non-adjustable;

Figs. 9 and 10 are plan views of the structure shown in Fig. 8, illustrating different ways in which it can be made;

Fig. 11 is another plan view of the non-adjustable construction illustrating a part of a multiple strip;

Fig. 12 is an end view of another non-adjustable construction.

In Fig. 1 a wire is bent as at 20 to form a rounded end from which a straight shank 21 extends and also a longer straight shank 22. A plurality of such wires form transverse members of the material. The lower ends of shanks 21, 22 are affixed to longitudinal wires 23, 24, respectively, in any suitable way, such as by welding. The wires 23, 24 are of indefinite length. The material may be shipped readily when the shanks 21, 22 are close to each other, as shown in Fig. 1. When it is to be applied to a desired structure, it is opened as shown in Figs. 2 and 5, for example, and secured in place by cleats, such as 25 shown in Fig. 4. These cleats have spaced bayonet slots 26, 27 for receiving the shanks 21, 22 and one or more apertures 28 for fastening screws, bolts or nails. The cleats extend over and can be forced down upon the longitudinal wires 23, 24.

This material is flexible in two directions. The wires 23, 24 may be bent to conform to arches or irregularities of the structure to which the bird proofing is applied. The wires 23, 24 may be moved apart to a greater or less degree to adapt the material to structures of different widths. When the wires 23, 24 are farther apart than they are in Figs. 2 and 4, as they are shown in Fig. 3, cleats 25 of a proper length are used.

This material is applied with the longer shanks 22 toward the face of the structure so that they slant inwardly and are less visible from the street or ground than they would be if they were vertical.

The shanks of transverse members are made of different lengths and spaced on the longitudinal wires, according to the size of the birds which infest the structure to be protected. I have shown and described the shanks 21, 22 as being of unequal length as this is a preferred construction, but I do not intend to limit myself in this particular.

For wide structures the material may be made up in multiple strips, as shown in Fig. 6. In this case shanks 21A are welded to the wire 24 between the shanks 22 and shanks 22A welded to a third wire 24A. Similarly shanks 21B are welded to wire 24A between shanks 22A and shanks 22B are welded to a fourth wire 24B. Such material is made and shipped with the shanks parallel.

Another form of material for protecting wide surfaces is illustrated in Fig. 7. In this case the transverse members are each made of a wire bent to form a plurality of spaced alined loops 30, 31, 32. At a point spaced from loop 32 it is bent upwardly, as at 33. A longitudinal wire 23C is welded in the angle thus formed. The transverse wire extends upwardly to form a shank 34 of desired length, thence downwardly to form a rounded projection 20A and a shorter shank 35. From the lower end of shank 35 the wire forms a part 36 parallel to the loops 30, 31, 32, thence upwardly and downwardly to form shanks 37, 38 and an intermediate rounded projections 20B. The parts 39, 40 and 20C are similar to the parts 36, 37 and 20B.

From projection 20C the wire extends as at 41 down to and around a part 48 of the wire with which it forms a sliding fit. Thence, a part 42 extends upwardly to one end of a part 43, similar to part 36, then up and down to form the parts 44, 45 and an intermediate projection 20D. From the outer end of the part 46 the wire extends downwardly as at 47, around a longitudinal wire 24C which is welded to it and back as at 48 through the loop between the parts 41 and 42. Its end terminates in a hook 49 which is arranged to engage the loops 30, 31, 32.

When the hook 49 engages loop 32, the wire is in substantially the condition in which it is shown in Fig. 7. It can be distended laterally so that hook 49 can engage the loop 31 or the loop 30.

With this construction the projections are held considerably above the base to which the bird proofing is applied, with an intermediate space below them which is automatically cleared of leaves and debris by the wind which passes through it. The parts 41 and 42 form an intermediate brace to strengthen the material.

In Fig. 8, 50 designates rigid transverse members in the form of a right triangle, in the lower corners of which are welded longitudinal wires 51, 52. The members 50 may be spaced as shown in Fig. 9, or closer together as in Fig. 10, according to the service required. This material may also be made up in multiple strips, as shown in Fig. 11, in which transverse members 50A are welded to the wire 52 between the members 50 and to a third wire 52A.

Another substantially triangular form is shown at 70 in Fig. 12. This is similar to the form shown in Fig. 8, except that the hypothenuse is bent inwardly, as at 71, to reduce the area within its sides. A longitudinal wire 72 is welded in its rectangular corner. Another longitudinal wire 73 is welded to its short side under the bend 71. A third longitudinal wire 74 is welded to the adjacent side sufficiently below the part which forms the rounded projection 75 that it cannot form a foothold for the birds. This form may be used with the wires 72, 73 attached to a structure or turned over 90° and the wires 72, 74 attached to the structure. In the latter case the wire 73 is sufficiently below the apex 76 that it will not form a foothold.

Several modifications and arrangements have been illustrated and described to show that I am not limited to any specific construction, and I intend no limitations other than those imposed by the appended claims.

What I claim is:

1. Bird proofing material comprising a pair of longitudinal wires and a plurality of spaced transverse members each comprising a wire having a rounded bend with shanks extending from the bend to the longitudinal wires, the ends of said shanks being secured to the longitudinal wires, said bends forming rounded projections, combined with cleats for affixing the material to a desired structure, said cleats overlapping the longitudinal wires and having means for holding the parts of the shanks remote from the bend spread apart.

2. Bird proofing material comprising a pair of longitudinal wires and a plurality of spaced transverse members each comprising a wire having a rounded bend with shanks extending from the bend to the longitudinal wires, the ends of said shanks being secured to the longitudinal wires, said bends forming rounded projections combined with cleats for affixing the material to a desired structure, said cleats overlapping the longitudinal wires and being constructed with spaced bayonet slots for receiving said shanks and arranged to hold the parts of the shanks remote from the bend spread apart.

3. Bird proofing material comprising at least three longitudinal wires, a plurality of transverse members each comprising a wire having a rounded bend with shanks extending from the bend to the longitudinal wires, said bends forming rounded projections, some of said transverse members being in spaced relation with the ends of their shanks affixed to the first and second of the longitudinal wires and others of the transverse members placed between those affixed to the first and second of the longitudinal wires with the ends of their shanks secured to the second and third of the longitudinal wires.

4. Bird proofing material comprising a pair of longitudinal wires and a plurality of spaced transverse members each comprising a wire having a rounded bend with shanks of unlike lengths extending from the bend to the longitudinal wires, the ends of said shanks being secured to the longitudinal wires, said bends forming rounded projections, combined with cleats for affixing the material to a desired structure, said cleats overlapping the longitudinal wires and having means for holding the parts of the shanks remote from the bend spread apart.

FREDERICK W. CALDWELL.